(12) United States Patent
Labonte et al.

(10) Patent No.: US 9,942,149 B2
(45) Date of Patent: Apr. 10, 2018

(54) SYSTEM AND METHOD OF USING AN EXACT MATCH TABLE AND LONGEST PREFIX MATCH TABLE AS A COMBINED LONGEST PREFIX MATCH

(71) Applicant: Arista Networks, Inc., Santa Clara, CA (US)

(72) Inventors: Francois Labonte, Menlo Park, CA (US); Hugh W. Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/585,118

(22) Filed: May 2, 2017

(65) Prior Publication Data

US 2017/0237662 A1    Aug. 17, 2017

Related U.S. Application Data

(63) Continuation of application No. 14/724,092, filed on May 28, 2015, now Pat. No. 9,680,749.

(Continued)

(51) Int. Cl.
*H04L 12/745* (2013.01)
*H04L 12/713* (2013.01)

(52) U.S. Cl.
CPC .......... *H04L 45/748* (2013.01); *H04L 45/586* (2013.01)

(58) Field of Classification Search
None
See application file for complete search history.

(56) References Cited

U.S. PATENT DOCUMENTS 6,011,795 A    1/2000   Varggese
6,018,524 A    1/2000   Turner
(Continued)

OTHER PUBLICATIONS

V. Srinivasan et al., "Fast Address Lookups Using Controlled Prefix Expansion", ACM Transaction on Computer Science, vol. 17, No. 1, Feb. 1999, pp. 1-40.

*Primary Examiner* — Jenee Holland
(74) *Attorney, Agent, or Firm* — Womble Bond Dickinson (US) LLP

(57) ABSTRACT

A method and apparatus of a device that determines a match for a destination address using an exact match table and a longest prefix match table of a network element is described. In an exemplary embodiment, the network element receives a data packet that includes a destination address. The network element generates a key for the destination address, wherein the key represents more addresses than the destination address. The network element further performs an address lookup using the key in an exact match table. Furthermore, a match in the address lookup indicates a first transmitting interface of the network element. The network element additionally performs an address lookup using the destination address with a longest prefix match table, wherein a match in the address lookup indicates a second transmitting interface of the network element. In addition, the network element determines a resulting transmitting interface based on results from the exact match table address lookup and the longest prefix match address lookup. The network element forwards the data packet using the transmitting interface.

23 Claims, 12 Drawing Sheets

Related U.S. Application Data

(60) Provisional application No. 62/126,390, filed on Feb. 27, 2015.

(56) References Cited

U.S. PATENT DOCUMENTS

| | | | |
|---|---|---|---|
| 7,043,494 B1* | 5/2006 | Joshi | G06F 17/30961 |
| 2001/0037396 A1 | 11/2001 | Tallegas | H04L 29/06 |
| | | | 709/230 |
| 2002/0046291 A1 | 4/2002 | O'Callaghan | H04L 45/7453 |
| | | | 709/238 |
| 2002/0172065 A1 | 11/2002 | Uzawa | G11C 15/00 |
| | | | 365/49.17 |
| 2003/0023581 A1 | 1/2003 | Davis | H04L 45/54 |
| 2003/0028713 A1* | 2/2003 | Khanna | G11C 15/04 |
| | | | 711/108 |
| 2003/0035000 A1* | 2/2003 | Licon | G06F 17/30867 |
| | | | 715/747 |
| 2003/0123397 A1 | 7/2003 | Lee | H04L 45/742 |
| | | | 370/256 |
| 2003/0225907 A1 | 12/2003 | Krishnan | H04L 45/00 |
| | | | 709/238 |
| 2003/0233516 A1* | 12/2003 | Davis | H04L 69/12 |
| | | | 711/108 |
| 2004/0006668 A1 | 1/2004 | Park | G11C 15/00 |
| | | | 711/108 |
| 2004/0073715 A1 | 4/2004 | Folkes | |
| 2004/0085953 A1 | 5/2004 | Davis | |
| 2004/0111439 A1 | 6/2004 | Richardson | |
| 2004/0111440 A1 | 6/2004 | Richardson | |
| 2004/0122794 A1* | 6/2004 | Gwizdaloski | G06F 17/245 |
| 2004/0139274 A1 | 7/2004 | Hui | G06F 17/30982 |
| | | | 711/108 |
| 2004/0215609 A1 | 10/2004 | Takatsu | |
| 2004/0230696 A1* | 11/2004 | Barach | H04L 45/00 |
| | | | 709/238 |
| 2004/0236720 A1* | 11/2004 | Basso | G06F 17/30985 |
| 2004/0243563 A1 | 12/2004 | Heiner | H04L 29/06 |
| 2004/0249803 A1* | 12/2004 | Vankatachary | H04L 45/00 |
| 2004/0249970 A1 | 12/2004 | Castro | H04L 29/12009 |
| | | | 709/238 |
| 2004/0264374 A1 | 12/2004 | Yu | H04L 45/00 |
| | | | 370/230 |
| 2005/0055339 A1 | 3/2005 | Richardson | H04L 45/00 |
| 2005/0083935 A1 | 4/2005 | Kounavis | |
| 2005/0100012 A1* | 5/2005 | Kaxiras | H04L 45/742 |
| | | | 370/389 |
| 2005/0102685 A1 | 5/2005 | Hariharan | G06F 8/24 |
| | | | 719/328 |
| 2005/0120017 A1 | 6/2005 | Motoki | |
| 2005/0141519 A1 | 6/2005 | Rajgopal | |
| 2005/0144553 A1* | 6/2005 | Bass | G06F 17/30985 |
| | | | 715/231 |
| 2007/0094441 A1* | 4/2007 | Kim | G11C 15/00 |
| | | | 711/108 |
| 2007/0294502 A1* | 12/2007 | Gunther | G06F 17/2247 |
| | | | 711/173 |
| 2008/0222094 A1* | 9/2008 | Cox | G06F 19/22 |
| 2009/0080452 A1 | 3/2009 | Ra | H04L 45/00 |
| | | | 370/419 |
| 2010/0195655 A1 | 8/2010 | Jacobson | H04L 45/748 |
| | | | 370/392 |
| 2010/0205135 A1 | 8/2010 | Ongole | |
| 2010/0260203 A1 | 10/2010 | Moon | H04W 80/045 |
| | | | 370/467 |
| 2010/0309795 A1 | 12/2010 | Shah | |
| 2011/0060876 A1* | 3/2011 | Liu | G06F 17/30949 |
| | | | 711/108 |
| 2011/0222539 A1 | 9/2011 | Grosser | H04L 45/60 |
| | | | 370/392 |
| 2011/0283061 A1 | 11/2011 | Reddy | G11C 15/00 |
| | | | 711/108 |
| 2013/0031077 A1 | 1/2013 | Liu | G06F 7/02 |
| | | | 707/706 |
| 2013/0246697 A1* | 9/2013 | Estan | G11C 7/1072 |
| | | | 711/104 |
| 2013/0246698 A1* | 9/2013 | Estan | G11C 7/1072 |
| | | | 711/108 |
| 2014/0153573 A1 | 6/2014 | Ramesh | H04L 45/748 |
| | | | 370/392 |
| 2014/0156667 A1* | 6/2014 | Kapadia | G06F 17/30946 |
| | | | 707/741 |
| 2014/0244815 A1 | 8/2014 | Bhardwaj | H04L 45/745 |
| | | | 709/223 |
| 2014/0310307 A1 | 10/2014 | Levy | H04L 45/7453 |
| | | | 707/769 |
| 2015/0098470 A1* | 4/2015 | Sun | H04L 45/748 |
| | | | 370/392 |
| 2015/0124633 A1 | 5/2015 | Banerjee | H04L 45/745 |
| | | | 370/252 |
| 2015/0131665 A1 | 5/2015 | Griswold | H04L 45/745 |
| | | | 370/392 |
| 2015/0146539 A1* | 5/2015 | Mehta | H04L 47/125 |
| | | | 370/237 |
| 2016/0134536 A1 | 5/2016 | Wang | H04L 45/7457 |
| | | | 370/392 |
| 2016/0134537 A1 | 5/2016 | Huynh | H04L 45/7457 |
| | | | 709/238 |
| 2016/0234112 A1 | 8/2016 | Anand | H04L 45/00 |
| 2016/0239362 A1* | 8/2016 | Edmiston | G06F 11/0721 |

* cited by examiner

| ENTRY TYPE 402 | KEY 404 | RESULT 406A | RESULT 406B |
|---|---|---|---|
| EXACT MATCH 408A | 243.12.32.0/23 | NEXTHOP E | N/A |
| TWO RESULTS 408B | 10.0.4.0/23 | 10.0.4.0/24 --> NEXTHOP A | 10.0.5.0/24 --> NEXTHOP B |
| TWO RESULTS 408C | 243.12.32.0/23 | 243.12.32.0/24 -> NEXTHOP E | 243.12.33.0/24 -> NEXTHOP E |
| SHORTEN PREFS 408D | 11.1.4.0/23 | 11.1.4.0/24 -> NEXTHOP A | 11.1.5.0/24 -> NEXTHOP A |
| EXAMPLE: 11.1.4.0/22 | 11.1.6.0/23 | 11.1.6.0/24 -> NEXTHOP B | 11.1.7.0/24 -> NEXTHOP C |

MATCH TABLE ENTRY TYPES
400

FIGURE 4

SYSTEM AND METHOD OF USING AN EXACT MATCH TABLE AND LONGEST PREFIX MATCH TABLE AS A COMBINED LONGEST PREFIX MATCH

RELATED APPLICATIONS

Applicant claims the benefit of priority of prior, co-pending non-provisional application Ser. No. 14/724,092, filed May 28, 2015; which claims the benefit of priority of prior, provisional application Ser. No. 62/126,390, filed Feb. 27, 2015, the entirety of which is incorporated by reference.

FIELD OF INVENTION

This invention relates generally to data networking, and more particularly, to performing longest prefix match forwarding lookups using a combination of longest prefix match table and an exact match table with specific prefix lengths.

BACKGROUND OF THE INVENTION

A network element with multiple interfaces can route data from one network to another network by receiving the data, analyzing the data, and deciding which interface to transmit the data and which next hop rewrite to perform on the packet. In particular, if the data is stored in a packet, the network element determines the transmission interface by analyzing a destination address stored in the packet header. The network element lookups a match for the destination address in a forwarding table to determine both which interface the network element will transmit the packet and which next hop rewrite to perform. The forwarding information is stored in a forwarding table. Each entry in the forwarding table includes an address subnet and an interface and a next hop rewrite, which is a next hop. The subnet is a subdivision of a network and is represented by a range of network addresses, or addresses.

Various structures can be used to store entries for a forwarding table. For example, a longest prefix match table can be used to store the forwarding table entries. In this example, the network element performs a lookup to determine which of the entries match using the longest prefix match table. Longest prefix match tables can be implemented in a few different ways which are sometimes expensive in terms of chip area and power.

SUMMARY OF THE DESCRIPTION

A method and apparatus of a device that determines a match for a destination address using an exact match table and a longest prefix match table of a network element is described. In an exemplary embodiment, the network element receives a data packet that includes a destination address. The network element generates a key for the destination address, wherein the key represents more addresses than the destination address. The network element further performs an address lookup using the key in an exact match table. Furthermore, a match in the address lookup indicates a first next hop. The network element additionally performs an address lookup using the destination address with a longest prefix match table, wherein a match in the address lookup indicates a second next hop. In addition, the network element determines a resulting next hop based on results from the exact match table address lookup and the longest prefix match address lookup. The network element forwards the data packet using the next hop.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 4 is an illustration of one embodiment of an exact match table with prefixes of specific lengths.

DETAILED DESCRIPTION

Figure 1:
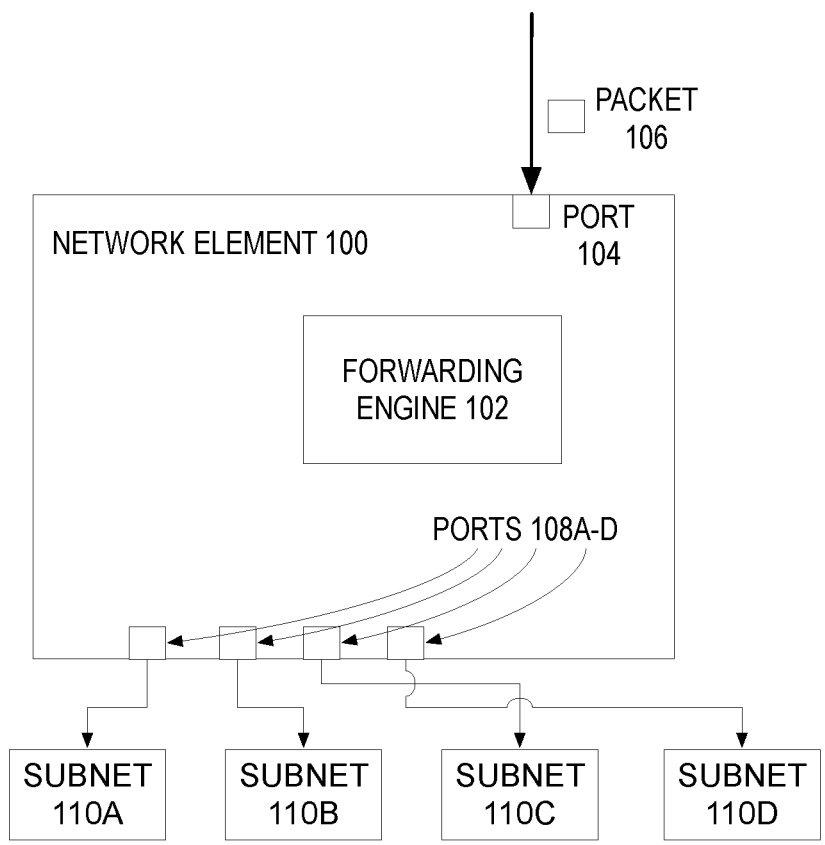
FIG. 1 is a block diagram of one embodiment of a network element that includes a forwarding engine.

A method and apparatus of a device that determines a match for a destination address using an exact match table and a longest prefix match table of a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that determines a match for a destination address using an exact match table and a longest prefix match table of a network element is described. In one embodiment, the device uses a destination address to update the forwarding table using specific prefix length keys and to make forwarding decisions for a destination address in a packet to be processed. In one embodiment, the forwarding table of the device includes two different tables: an exact match table and a longest prefix match table. In this embodiment, the exact match table is a table of forwarding entries that is used for an exact match address lookup of the destination address. The exact match address lookup determines a match if the specific lookup which might only include a subset of the destination Internet Protocol (IP) address matched with an entry in the exact match table. For an exact match address lookup, there is one match but a couple of results might be encoded for adjacent route lookups. In one embodiment, the device stores routes in the exact match table with specific prefix lengths. For example and in one embodiment, the device stores routes that are 22-24 bits long. Each of the entries includes a key and a result. In this embodiment, the key is a data element that is used to find the result in the exact match table and the result is a next hop for a destination address matching that key.

On the other hand, for a longest prefix match address lookup, an address may match many different entries in the longest prefix match table. A longest prefix match address lookup returns the forwarding entry that has the longest prefix match to the address that is used for the lookup. For example and in one embodiment, if one forwarding entry can match 16 bits of an address and another forwarding entry matches 24 bits of an address, the second forwarding entry is used for the longest prefix match.

In another embodiment, the device makes a forwarding decision by receiving a packet that includes a destination address. The device generates a key from the destination address. In one embodiment, the device masks the lower m bits of the destination address to generate a N-bit key. For example and in one embodiment, the device receives a 32-bit destination address, the device generates a 24-bit key by masking the lower 8 bits of the destination address. The device uses this key to perform a lookup with the exact match table. In another embodiment, the device can also perform a longest prefix match addressed lookup using the destination concurrently with the exact match address lookup using the address. In this embodiment, the device may get a result from the exact match address lookup, the longest prefix match, or both. In one embodiment, if the device receives a result from the exact match address lookup, the device uses this result for the forwarding decision of the packet. If there is both exact match address lookup and a longest prefix match address lookup result, the device will use the exact match address lookup result. If there is no exact match address lookup result and there is a longest prefix match address lookup result, the device uses the longest prefix match address lookup result for the forwarding decision of the packet. The device uses this selected result to make a forwarding decision.

FIG. 1 is a block diagram of one embodiment of a network element 100 that includes a forwarding engine 102. In FIG. 1, the network element 100 includes a forwarding engine 102 that forwards a received packet 106 on port 104 out one of the ports 108A-D based on the destination address in the packet 106. In one embodiment, the network element receives the packet 106 on the receiving port 104 and analyzes the packet 106 based on the destination address in the packet 106 to determine which port 108A-D to transmit the packet 106. In this embodiment, each of the possible transmitting ports 108A-D is coupled to a corresponding subnet 110A-D, which can be a destination subnet for the incoming packet 106. The forwarding engine 102 includes a forwarding table (described further below) that the forwarding engine 102 uses to determine which ports 108A-D to transmit the packet 106. In one embodiment, the forwarding engine 102 performs an address lookup using the forwarding table for the packet destination address to determine a next hop for the packet.

In one embodiment, the forwarding table can include forwarding information. For example and in one embodiment, the routing table stores routing table entries for the one or more routing protocols that is used by the hardware forwarding engine, by using any of the running protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), and any/or other type or unicast routing protocol known in the art. In another embodiment, the forwarding table can store routing information for Internet Protocol (IP) v4 and IPv6 addresses. In one embodiment, the forwarding table applies to virtual routing and forwarding (VRF) where the VRF identifier is part of the key being looked up in both the longest prefix match table and the exact match table.

As described above, the forwarding table can be stored in software (e.g., the network element's main memory) or can be stored in hardware (e.g., specialized fast-performing hardware data structure such as a ternary content-addressable memory (TCAM), a multi-level trie, or another type of specialized memory). In one embodiment, the exact match table is implemented as a hash table in hardware. The Longest prefix match table can be implemented in a variety of ways including combinations of TCAM and memory or multi-level hash table). Storing the forwarding table in software leads to poor performance. Hardware storage of the forwarding table leads to better performance but the specialized memory is expensive both in terms of cost and the power requirement. Thus, the network element 100 will tend to use a smaller amount of the specialized memory.

In one embodiment, each forwarding table entry includes an address or address range (e.g., a subnet) and a next hop. In one embodiment, the next hop is an interface that is used by the network element 100 to transmit a packet with an address that matches this forwarding entry. In this embodiment, network element 100 can include two different types tables to store the forwarding information: a longest prefix match table and an exact match table. For a given destination address, the network element 100 performs address lookups on the destination address using both tables. Based on these results, the network element decides which address lookup result to use. In one embodiment, the network element 100 performs these address lookups concurrently.

Figure 2:
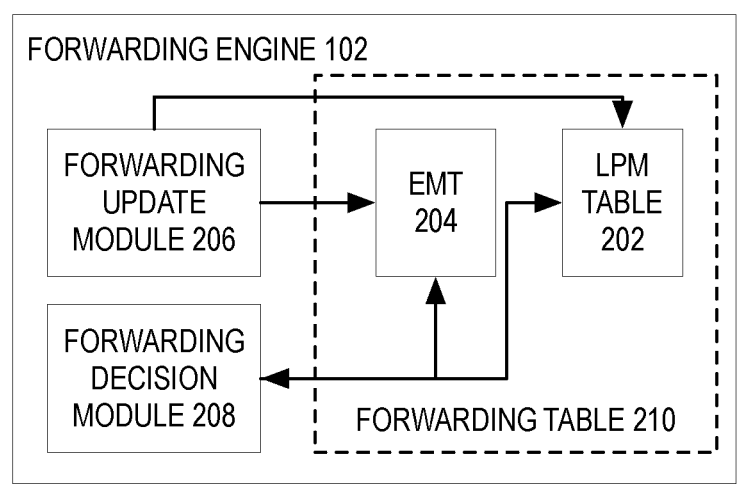
FIG. 2 is a block diagram of one embodiment of a forwarding engine that includes a longest prefix table and an exact match table.

FIG. 2 is a block diagram of one embodiment of a forwarding engine 102 that includes a longest prefix table 202 and an exact match table 204. In FIG. 2, the forwarding engine 102 includes a forwarding table 210, a forwarding update module 206, and a forwarding decision module 208. In one embodiment, the forwarding table 212 includes multiple tables of forwarding information that is used make forwarding decisions. In this embodiment, the forwarding table 212 includes an exact match table (EMT) 204 and a longest prefix match (LPM) table 202. In one embodiment, the EMT 204 is a hash table that is used for exact match address lookup to determine a next hop for a packet. Alternatively, the EMT 204 can be a different type of table. In this embodiment, an exact match means that an address lookup will have a match for a key based address if that key is in the table. This is in contrast to a longest prefix match, which matches based on parts of an address. In one embodiment, the EMT 204 is stored in memory that is different from a TCAM. For example and in one embodiment, the EMT 204 is stored in memory that is four to eight times cheaper than a TCAM.

In one embodiment, the EMT 204 is used to perform address lookups for matches with specific prefix lengths. In one embodiment, an address prefix length is the number of bits set in the mask of the address. In one embodiment, the EMT 204 is used by looking up a single prefix length but effectively storing different key prefixes. For example and in one embodiment, entries can be stored for 22, 23, and 24 bit prefixes or entries with different length prefixes but the exact match lookup is done for 23 bit length. In this example, routes with 24 bit prefixes (e.g., /24) can be a common route stored in a forwarding table. To use the EMT 204 for address lookups, the network element generates a key of up to N bits of the destination address and uses this key to perform the exact match address lookup. In one embodiment, the network element can generate multiple keys from the same destination address and use these keys to perform multiple exact match address lookup for that destination address. These lookups with different prefix lengths could be done in different exact match tables or in the same one provided the lookup for different prefix lengths were distinguished key that is also part of the exact match lookup. For example, if the forwarding engine performs both a 23 and 19 bit prefix lookup the lookup for the 23 bit would be 1'b0 followed by the first 23 bits of the destination IP address then all zeroes afterwards and the lookup for 19 bits would be 1'b1 followed by the first 19 bits of the destination IP address and then all zeroes. In one embodiment, performing multiple lookups (e.g., using EMT 204 and LPM 202) and/or with multiple keys, there is the potential for multiple address lookup results. In this embodiment, the forwarding engine 102 determines which lookup results are to be used for the destination address.

In another embodiment, the EMT 204 can store multiple results in a single exact match table entry. If the exact match result is wider than the nexthop encoding or if the exact match table lookup is limited to fewer possible nexthops, the forwarding engine 102 encodes a power of 2 nexthops per exact match table lookup. In this embodiment, the forwarding engine 102 uses more bits from the destination address lookup to resolve which one of the actual nexthops is chosen. For example and in one embodiment, say a lookup for a /24 key in the EMT 204 is performed, where an entry is encoded with two nexhops per result, the forwarding engine 102 can encode 2 adjacent /25 routes as a single entry in the hash table. The forwarding engine 102 then uses bit 25 of the destination address to resolve which of the nexhops to use.

Furthermore, and in one embodiment, the forwarding engine 102 can store shorter prefixes using multiple table entries in the EMT 204. Assuming that the forwarding engine 102 performs lookups using 24-bit keys (e.g., looking up /24 routes in the hash table), the forwarding engine 102 could store prefixes shorter than /24 routes using multiple EMT 204 entries. For example and in one embodiment, a /23 route can be stored in the EMT 204 by inserting 2 /24 route entries in the EMT 204 by expanding the shorter /23 prefix into the two /24 prefixes. Similarly, for a /22 route, the network element expands the /22 route into 4 /24 routes.

As described above, the forwarding engine 102 also includes a longest prefix match table, LPM table 202. In one embodiment, the LPM table 202 is used to store forwarding entries for a longest prefix match type of address lookup. In this embodiment, a longest prefix match address lookup may match multiple entries in the LPM table 202. A longest prefix match address lookup returns the entry that has the longest prefix match to the address that is used for the lookup. For example and in one embodiment, if one forwarding entry can match 16 bits of an address and another forwarding entry matches 24 bits of an address, the second forwarding entry is used for the longest prefix match. In one embodiment, the LPM table 202 is stored in a TCAM, so that some or all on the entries in the LPM table can be searched concurrently. In one embodiment, the forwarding engine 102 uses the destination addresses for the address lookup with the LPM table 202.

As described above, the forwarding engine 102 can use two different types of address lookups: an exact match address lookup using a key lookup with the EMT 204 and a longest prefix match address lookup using the address with the LPM table 202. In one embodiment, the forwarding engine 102 can perform both address lookups concurrently. As will be described below, the forwarding engine 102 determines a next hop for a destination address by performing the key-based exact match address lookup and also performing a longest prefix match address lookup with the destination address. In this embodiment, the forwarding engine 102 takes the results of the two address lookups and decides which result to use for the next hop decision. In one embodiment, the forwarding decision module 210 performs one or both of the address lookups to determine a next hop for the destination address. In one embodiment, if the forwarding engine 102 performs the two address lookups concurrently by overlapping the time periods in which the two address lookups are performed. In one embodiment, if the exact match address lookup is preferred over the longest prefix match address lookup, the forwarding engine 102 may make sure that more specific routes are stored in the EMT 204 and not the LPM 202. In another embodiment, the forwarding engine 102 allows putting prefixes in the EMT 204 that have more specific prefixes underneath by encoding in the result of the LPM 202 length of the match and picking the appropriate result from the EMT 204 results or the LPM 202 based on the presence of hits on the EMT 204 lookups and the encoding of the LPM 202 result. The cost for this embodiment is that it limits the number nexthops that can be addressed from the LPM 202.

Figure 3:
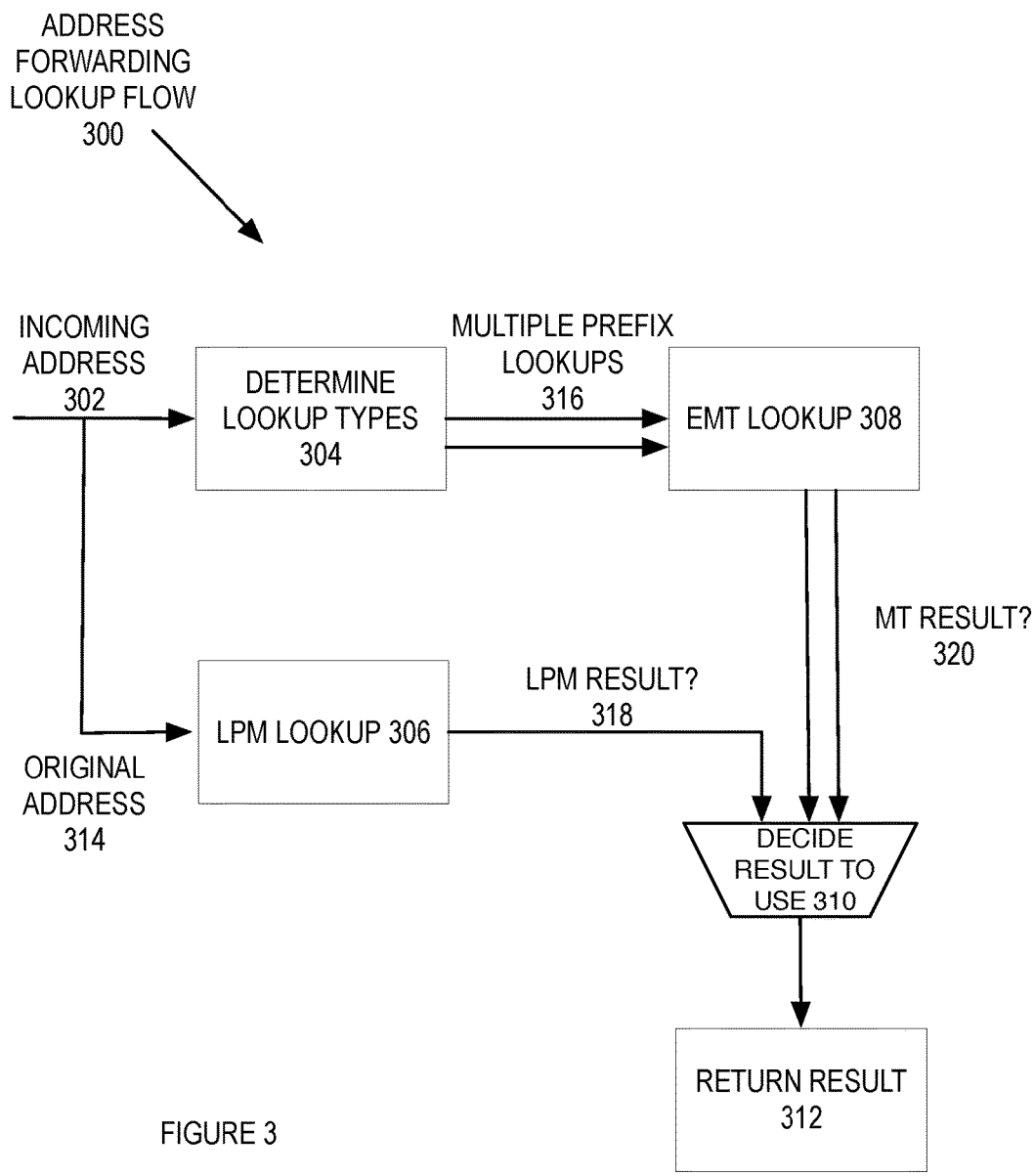
FIG. 3 is a block diagram of one embodiment of an address forwarding lookup flow.

FIG. 3 is a block diagram of one embodiment of an address forwarding lookup flow 300. In FIG. 3, the flow 300 begins with an incoming address (302). In one embodiment, the incoming address (302) is sent to determine the lookup types (304) for an EMT lookup (308) and also for a LPM lookup (306) using the original address (314). The EMT lookup (308) can include multiple prefix lookups (316) using the one or more keys generated form the incoming address (302). The EMT lookup result (320) and LPM lookup result (318) is send to a decider (310) that decides which result to use. In one embodiment, the decider (310) will use LPR result (318) if the LPM result (318) is the only valid result, use the EMT result (320) if the EMT result (320) is the only valid result, or use the EMT result (320) is there is both a valid EMT and LPM result. The result is returned (312). Alternatively, the decider (310) can choose the LPM result (318) over the EMT result (320). The flow is further described in FIG. 5 below.

As described above, the EMT 204 can store different types of entries. FIG. 4 is an illustration of one embodiment of an exact match table 400 with prefixes of specific lengths. In FIG. 4, the EMT can store many different types 402 of entries 408A-C, such an exact match 408A with a single entry, a match 408B-C that can match two different results, and a match 408D, in which the entry is generated by shortening the prefix for multiple entries. Each entry has a matching key 404 and one or two results 406A-B. While in FIG. 4, each result is illustrated with 1-2 results, in alternate embodiments, an entry can include more than two results.

In one embodiment, the exact match entry 408A with a single entry includes a key and a single result for that key. For example and in one embodiment, exact match 408A includes the key 243.12.32.0/23 and the result for that key, nexthop E. In this example, a destination address in the range 243.12.32.1-243.12.33.255 can be mapped to this key, which returns the nexthop E as a match. In another example and embodiment, entry 408B has two results for the key 10.0.4.0/23. In this example, there is a result nexthop A for addresses in the range of 10.0.4.0/24 and nexthop B for addresses in the range of 10.0.5.0/24. Which result is used depends on the input destination address. For example, if the destination address was 10.0.4.25, then nexthop A is the result, whereas for a destination address was 10.0.5.36, then nexthop B is the result. As another example and embodiment, a match entry 408C with two results can have the same nexthop for both results. Entry 408C has two results for the key 243.12.32.0/23. In this example, there is a result nexthop E for addresses in the range of 243.12.32.0/24 and 243.12.33.0/24. Thus, an address in the range of 243.12.32.1-243.12.33.255 would match this result when the key 243.12.32.0/23 is used.

In a further example, the match entry 408D can be used to match a key with a shorter prefix than is used to store the entries. In this example, a key for a /22 route (e.g., 11.1.4.0/22) can be broken up into adjacent /23 keys (e.g., 11.1.4.0/23 and 11.1.6.0/23). Each of the /23 keys can be used to match a pair of /24 results. The key 11.1.4.0/23 gives results for 11.1.4.0/24 and 11.1.5.0/25 addresses with nexthop A. In addition, the key 11.1.4.0/23 gives the result of nexthop B for 11.1.6.0/24 and nexthop C for 11.1.7.0/25.

Figure 5:
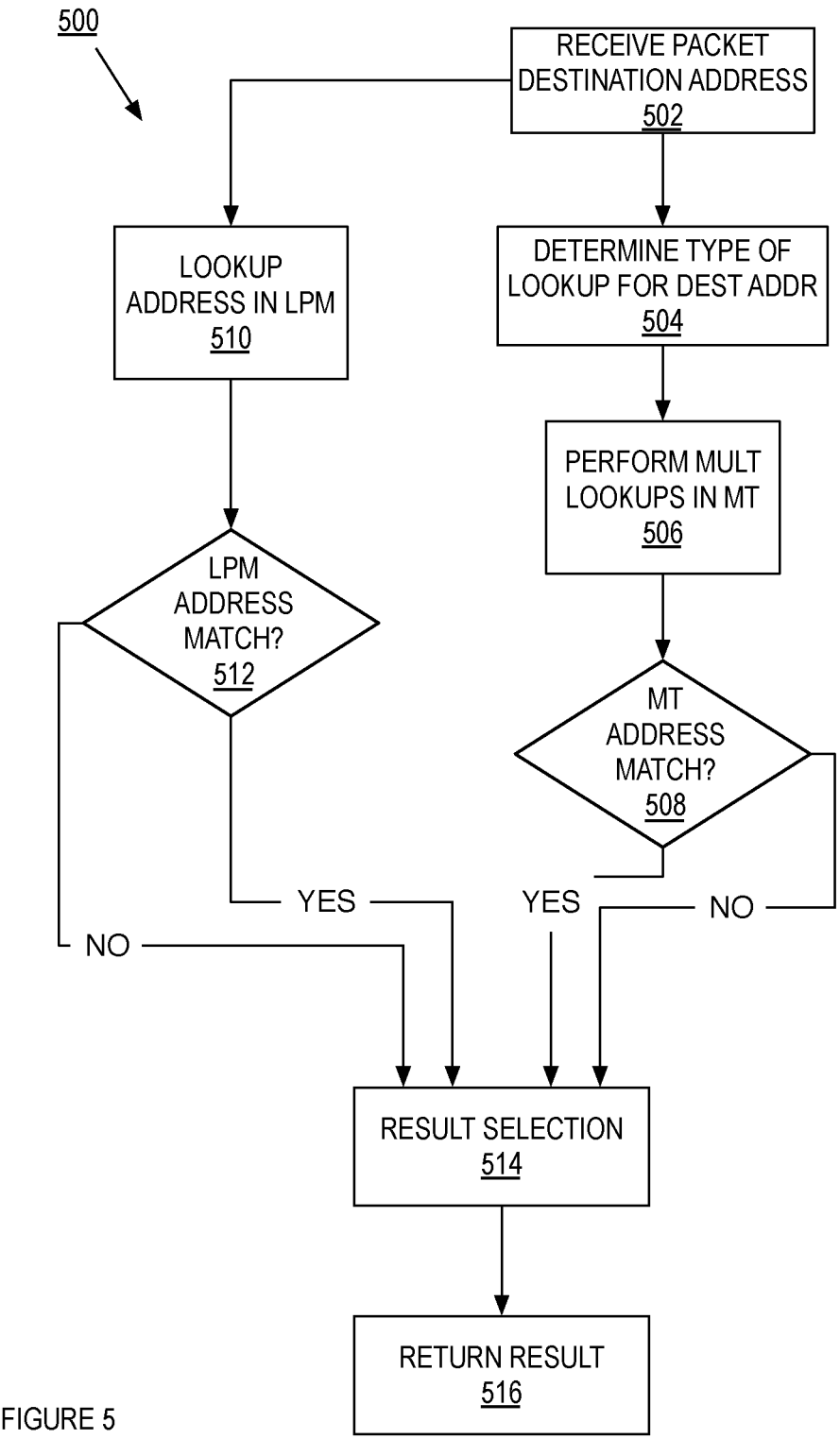
FIG. 5 is a flow diagram of one embodiment of a process to perform an address lookup using an exact match table with prefixes of specific lengths.

FIG. 5 is a flow diagram of one embodiment of a process 500 to perform an address lookup using an exact match table with prefixes of specific lengths. In one embodiment, a forwarding decision module performs process 500 to process an address using an exact match table, such as the forwarding decision module 208 as described in FIG. 2 above. In FIG. 5, process 500 begins by receiving a packet destination address at block 502. In one embodiment, the packet destination address is the destination address stored in a packet to be processed by the network element. In one embodiment, process 500 can process the packet destination address in different modes. In one embodiment, process 500 can process the packet destination address as a key address lookup (blocks 504-508) using the exact match table, as using the destination address (blocks 510-512) using the longest prefix table lookup, or in parallel using both the exact match table (blocks 504-508) and longest prefix table (blocks 510-512).

In one embodiment, process 500 determines the type of exact match lookup for the destination address at block 504. In one embodiment, the destination address is an N bit address that represents a single address, such as a 32-bit IPv4 address or a 128-bit IPv6 address. In this embodiment, process 500 further determines the type of key to be used for the exact match address lookup. In one embodiment, process 500 masks the lower m bits of the destination address to generate the key. For example and in one embodiment, if the destination address is 10.0.4.25, process 500 can mask the lower 8 bits of this 32-bit address to give a 24-bit, such as 10.0.4.0/24 key that is used to perform the exact match lookup. In another embodiment, the single destination address can be used to generate multiple keys. For example and in one embodiment, if the destination address is 10.0.4.25, process 500 can mask the lower 8 and 10 bits of this 32-bit address to generate two different keys: 10.0.4.0/24 and 10.0.4.0/22 keys. Each of these keys can be used to perform the exact match lookup. At block 506, process 500 performs an address lookup using an exact match table using the generated keys. In one embodiment, process 500 computes a hash for each of the generated keys and uses the computed hash(es) to lookup up the address in the exact match table. In another embodiment, process 500 can generate multiple keys form one address. Determining the lookup and generating the keys if further described in FIG. 6 below. Process 500 determines if there is an exact match table match at block 508. If there is a match, process 500 stores the next hop from the matching forwarding entry as the result of the exact match table lookup. In one embodiment, there can be more than one match, as there are possibly multiple keys generated at block 506. If there is no match, process 500 stores a negative indication as the result of the exact match table lookup.

If process 500 is performing an address lookup using the longest prefix match, process 500 performs the longest prefix match address lookup using the destination address at block 510. In one embodiment, a longest prefix match address lookup returns the entry that has the longest prefix match to the address that is used for the lookup as described in FIG. 2 above. At block 512, process 500 determines if there is a match from the longest prefix match address lookup. If there is a match, process 500 stores the next hop from the matching forwarding entry as the result of the longest prefix match table lookup. If there is no match, process 500 stores a negative indication as the result of the longest prefix match table lookup.

At block 514, process 500 selects the results from the address lookup(s). If there is a result from the exact match table lookup or if there is a result from both the exact match and the longest prefix match lookups, process 500 selects the result from the exact match lookup. In one embodiment, the LPM lookup will return a result, which can be the default route. In one embodiment, there is one exact match route stored in the EMT. If there are no underlying more specific route that if the exact match lookup hits, then the exact match lookup is the more specific route possible. In another embodiment, the LPM result is used if the LPM result is more specific than the result in the exact match. For example and in one embodiment, the address maybe stored in a forwarding entry in the exact match table may be different than a match from a longest prefix match. In this example, an exact match address lookup may return that the next hop for an address is if1, while the longest prefix match may return a default route that has a next hop for if2. With the two results, since there is an exact match of the destination address, the exact match result is preferred instead of the default route result of the longest prefix match. If there is a longest prefix result, but no exact match entry, process 500 returns the result from the longest prefix match. At block 516, process 500 returns the selected result. In another embodiment, process 500 chooses the longest prefix match result over the exact match result. In one embodiment, the network element uses the result to determine the next hop for the packet with the destination address. In this embodiment, the network element transmits the packet using the interface in the result.

Figure 6:
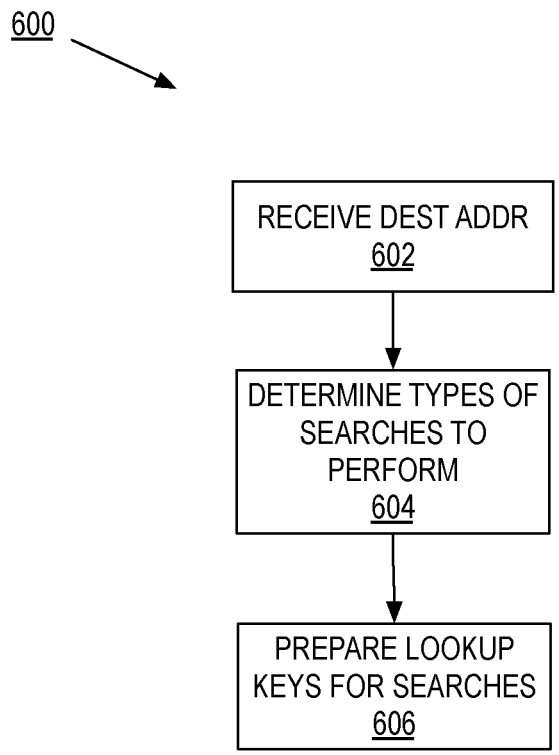
FIG. 6 is a flow diagram of one embodiment of a process to generate one or more keys used to perform the address lookup.

FIG. 6 is a flow diagram of one embodiment of a process 600 to generate one or more keys used to perform the address lookup. In one embodiment, a forwarding decision module performs process 600 to process an address using an exact match table, such as the forwarding decision module 208 as described in FIG. 2 above. In FIG. 6, process 600 begins by receiving the destination address at block 602. At block 604, process 600 determines the type(s) of searches to perform using the destination address. In one embodiment, process 600 determines the types of keys to generate for the exact match lookup. In one embodiment, the types of keys that process 600 generates are the types of keys that are stored in the exact match table. For example and in one embodiment, if the exact match table stores 24-bits keys, process 600 would generate a 24-bit key from the destination address. Alternately, if the exact match table stores 23 and 24-bits keys, process 600 would generate a 23-bit and a 24-bit key from the destination address. In a further embodiment, process 600 can generate multiple keys based on the type of entry stored in the exact match table. For example and in one embodiment, process 600 could generate two 23-bit keys that represents a 22-bit prefix, such as a key for a /22 route (e.g., 11.1.4.0/22) that is be broken up into two adjacent /23 keys (e.g., 11.1.4.0/23 and 11.1.6.0/23). At block 606, process 600 prepares the lookup keys for the exact match lookups. In one embodiment, process 600 masks out the lower m bits of the N bit address. For example and in one embodiment, process 600 masks out the lower 8, 9, or 10 bits of the address to generate a 24, 23, or 22 bit key, respectively from a 32-bit address.

Figure 7:
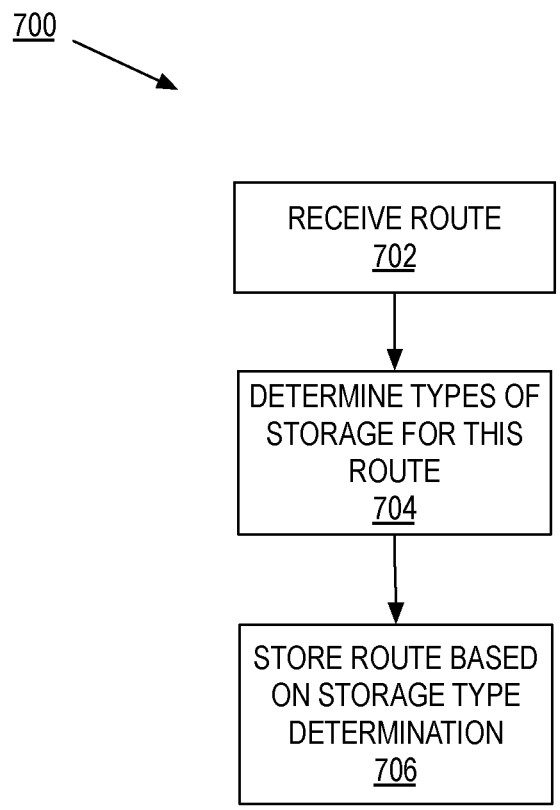
FIG. 7 is a flow diagram of one embodiment of a process to store a route in an exact match table with prefixes of specific lengths.

In order to be used for exact match address lookup, the EMT 204 needs to be populated. In one embodiment, the EMT 204 is populated with route coming from via user configuration, route announcements received from one or more different routing protocols, route statistics, first come-first serve, historical use with hysteresis to prevent churning, or another way to introduce/update routes into a forwarding table. FIG. 7 is a flow diagram of one embodiment of a process 700 to store a route in an exact match table with prefixes of specific lengths. In one embodiment, a forwarding update module performs process 700 to store a route in an exact match table, such as the forwarding update module 206 as described in FIG. 2 above. In FIG. 5, process 700 begins by receiving a route to be stored in a forwarding table at block 702. In one embodiment, process 700 receives the route from user configuration, route announcements received form one or more different routing protocols, route statistics, first come-first serve, historical use with hysteresis to prevent churning, or another way to introduce/update routes into a forwarding table. In one embodiment, the route includes an address and a next hop interface.

At block 704, process 700 determines the types of storage for this route. In one embodiment, how the route is stored depends on the length of prefix that is associated with the route. If the route is a 24-bit route, process 700 may store the route as a 24-bit route with a 24-bit key. Alternatively, process 700 may store the route as adjacent routes. For example and in one embodiment, if the route is a 22-bit route, process 700 may store the route as two adjacent 23-bit routes with two 23-bit keys, as described in FIG. 4 above. Process 700 stores the route based on the storage determination at block 706. In one embodiment, process 700 generates the key(s) for the route and stores the route. For example and in one embodiment, process 700 can store the route as a single entry and single result, an entry with two different results, or an entry in which the entry is generated by shortening the prefix for multiple entries as described in FIG. 4 above.

Figure 8:
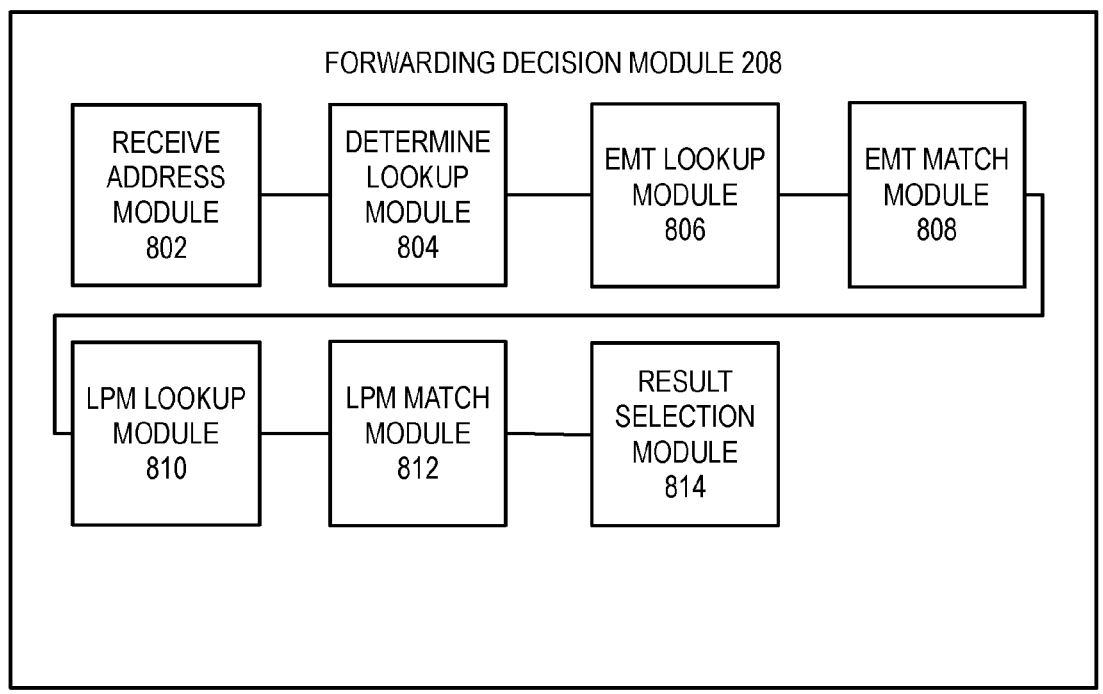
FIG. 8 is a block diagram of one embodiment of a forwarding decision module that processes an address using an exact match table.

FIG. 8 is a block diagram of one embodiment of a forwarding decision module 208 that processes an address using an exact match table. In one embodiment, the forwarding decision module 208 includes a received address module 802, determine lookup type module 804, exact match table lookup module 806, exact match table match module 808, longest prefix match lookup module 810, longest prefix match module 812, and result selection module 814. In one embodiment, the received address module 802 receives the destination address as described in FIG. 6, block 602. The determine lookup type module 804 determines the lookup type as described in FIG. 6, block 604. The exact match table lookup module 806 performs the exact match address lookup as described in FIG. 6, block 606. The exact match table match module 808 determines if there is a match as described in FIG. 6, block 608. The longest prefix match lookup module 810 performs a longest prefix match lookup as described in FIG. 6, block 610. The longest prefix match module 812 determines if there is a result from the longest prefix match lookup as described in FIG. 6, block 612. The result selection module 814 selects the result to return as described in FIG. 6, block 614.

Figure 9:
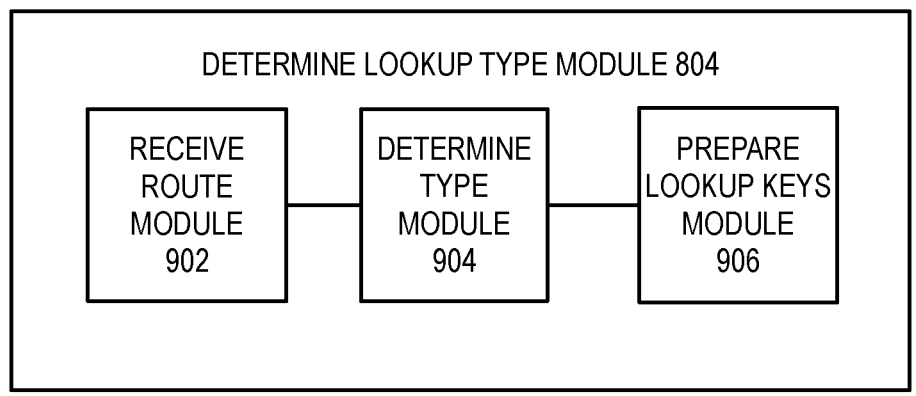
FIG. 9 is a block diagram of one embodiment of a determine lookup type module that determines the type of lookup for an address.

FIG. 9 is a block diagram of one embodiment of a determine lookup type module 804 that determines the type of lookup for an address. In one embodiment, the determine lookup type module 804 includes receive route module 902, determine type module 904, and prepare lookup keys module 906. In one embodiment, the receive route module 902 receives the route as described in FIG. 7, block 702 above. The determine type module 904 determines the type of lookup as described in FIG. 7, block 704 above. The prepare lookup keys module 906 prepares the lookup keys as described in FIG. 7, block 706 above.

Figure 10:
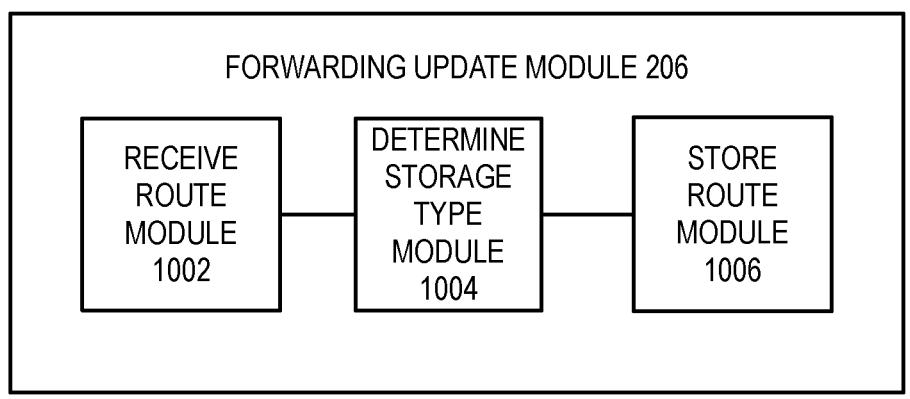
FIG. 10 is a block diagram of one embodiment of a forwarding update module that stores a route in an exact match table.

FIG. 10 is a block diagram of one embodiment of a forwarding update module 208 that stores a route in an exact match table. In FIG. 10, the forwarding update module 208 includes a receive route module 1002, determine storage type module 1004, and store route module 1006. In one embodiment, the receive route module 1002 receives the route as described in FIG. 8, block 802 above. The determine storage type module 1004 determines the type of storage for the route as described in FIG. 8, block 804 above. The store route module 1006 stores the route as described in FIG. 8, block 806 above.

Figure 11:
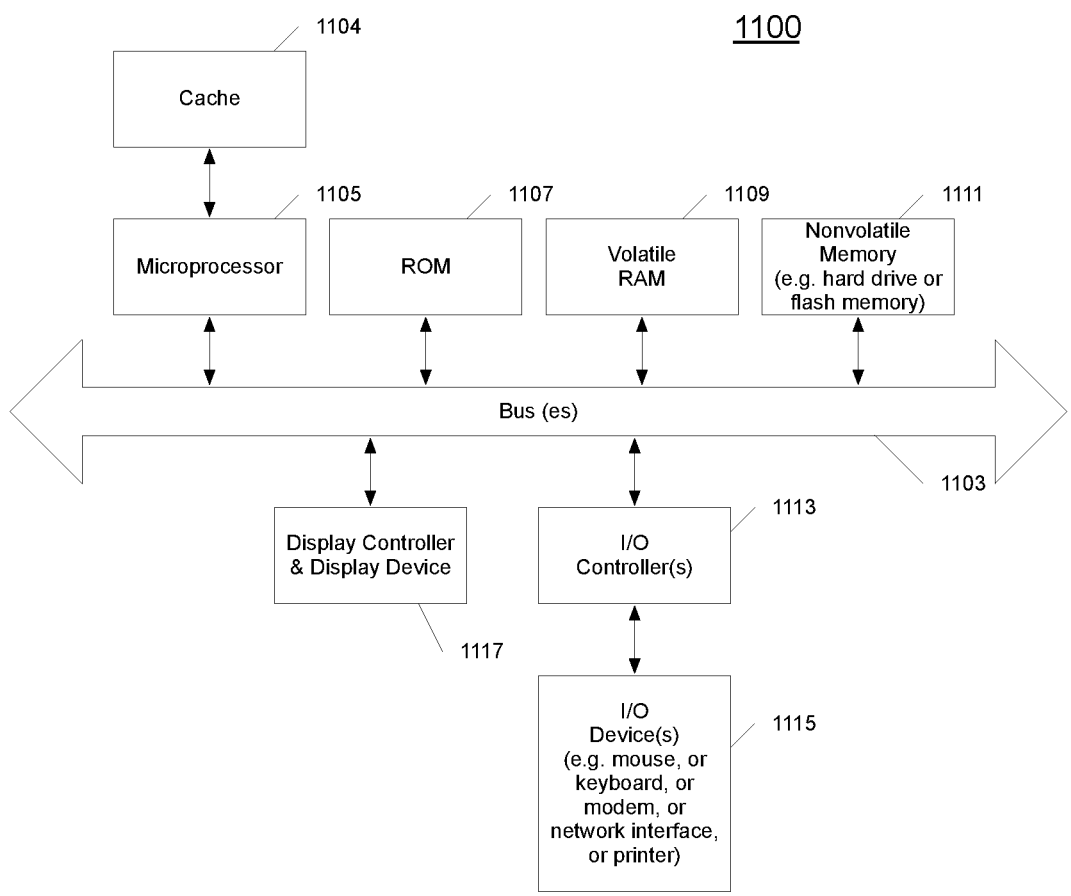
FIG. 11 illustrates one example of a typical computer system, which may be used in conjunction with the embodiments described herein.

FIG. 11 shows one example of a data processing system 1100, which may be used with one embodiment of the present invention. For example, the system 1100 may be implemented including a network element 100 as shown in FIG. 1. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1117 and to peripheral devices such as input/output (I/O) devices which may be mice, keyboards, modems, network interfaces, printers and other devices which are well known in the art. In one embodiment, the system 1100 includes a plurality of network interfaces of the same or different type (e.g., Ethernet copper interface, Ethernet fiber interfaces, wireless, and/or other types of network interfaces). In this embodiment, the system 1100 can include a forwarding engine to forward network date received on one interface out another interface.

Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
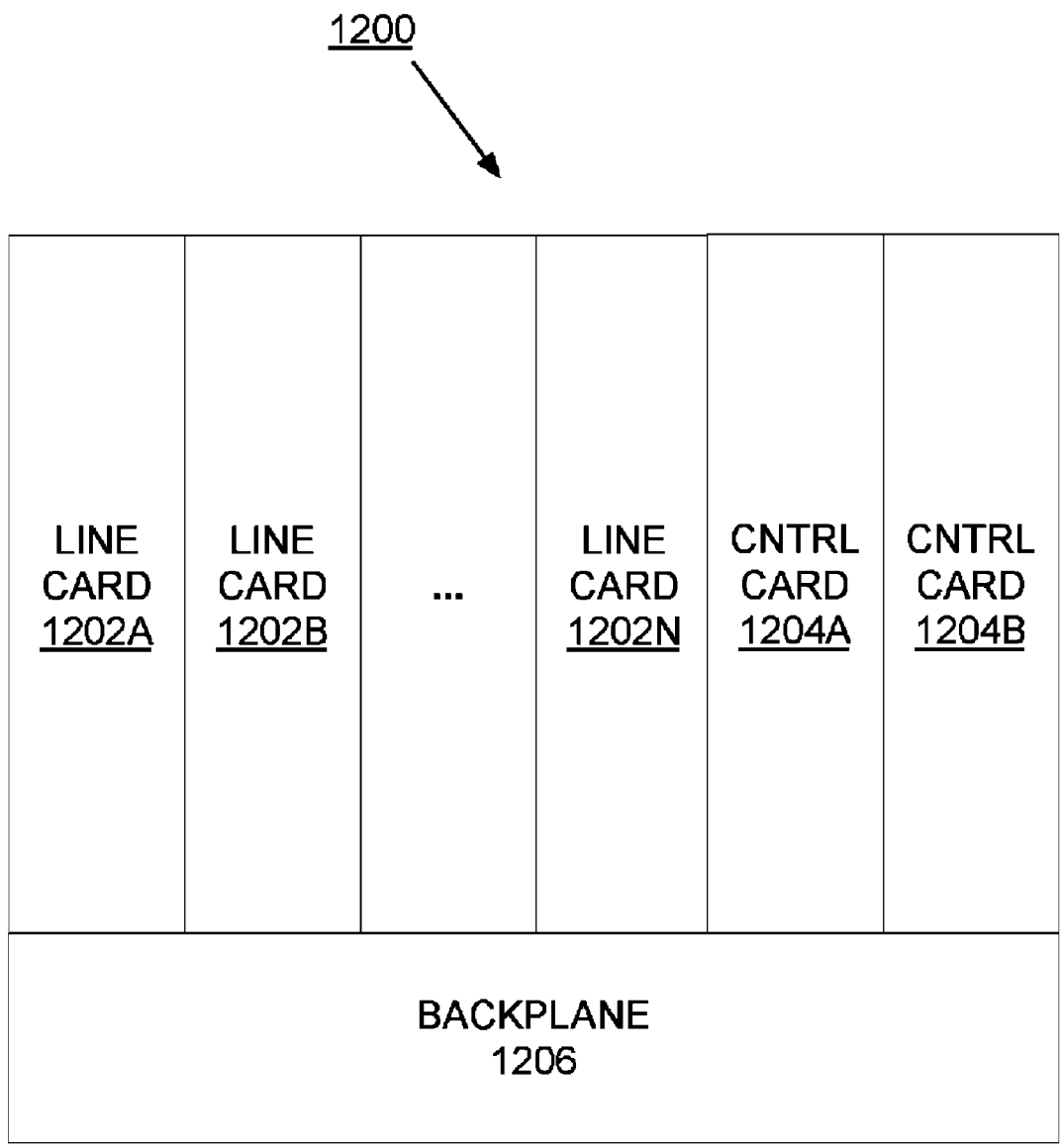
FIG. 12 is a block diagram of one embodiment of an exemplary network element that determines a match for an address using an exact match table of a network element.

FIG. 12 is a block diagram of one embodiment of an exemplary network element 1200 that determines a match for an address using an exact match table of a network element. In FIG. 12, the backplane 1206 couples to the line cards 1202A-N and controller cards 1204A-B. While in one embodiment, the controller cards 1204A-B control the processing of the traffic by the line cards 1202A-N, in alternate embodiments, the controller cards 1204A-B, perform the same and/or different functions (e.g., determining a match for an address using an exact match table of a network element, etc.). In one embodiment, the line cards 1202A-N process and forward traffic according to the network policies received from controller cards the 1204A-B. In one embodiment, one of the line cards 1202A-N determines a match for an address using an exact match table of a network element as described in FIGS. 2-7. In this embodiment, one, some, or all of the line cards 1202A-N includes the forwarding engine to determine a match for an address using an exact match table of a network element in this network element 1200, such as the forwarding engine 124 as described in FIG. 2 above. It should be understood that the architecture of the network element 1200 illustrated in FIG. 12 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "generating," "determining," "performing," "forwarding," "storing," "identifying," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine a match for a destination address using an exact match table and a longest prefix match table, the method comprising:
  receiving, with a network element, a data packet that includes a destination address;
  generating a lookup key for the destination address, wherein the lookup key represents more addresses than the destination address;
  performing an exact match table address lookup using the lookup key with an exact match table, wherein a first forwarding result is derived from a match in the exact match table address lookup and at least one of the entries in the exact match table includes,
    an exact match table key, and
    a plurality of forwarding indications, wherein each of the plurality of forwarding indications is associated with one of a plurality of prefixes associated with the exact match table key;
  performing a longest prefix match address lookup using the destination address with the longest prefix match table, wherein a second forwarding result is derived from a match of the longest prefix match address lookup and at least some of content in the lookup key overlaps with content used for the longest prefix match address lookup;
  determining a resolved forwarding result based on results from the exact match table address lookup and the longest prefix match address lookup; and
  forwarding the data packet using the resolved forwarding result.

2. The non-transitory machine-readable medium of claim 1, wherein performing the exact match address lookup comprises:
  matching the lookup key to the exact match table key;
  determining which of the plurality of prefixes associated with the exact match table key matches the destination address; and
  returning the first forwarding result associated with the matching prefix.

3. The non-transitory machine-readable medium of claim 2, wherein each of the plurality of prefixes is associated with a different forwarding indication.

4. The non-transitory machine-readable medium of claim 1, wherein the exact match table key is a first prefix.

5. The non-transitory machine-readable medium of claim 4, wherein the exact match table key further includes a reference to a table.

6. The non-transitory machine-readable medium of claim 5, wherein the reference to the table is a virtual routing and forwarding table reference.

7. The non-transitory machine-readable medium of claim 4, wherein the first prefix is a union of the plurality of prefixes.

8. The non-transitory machine-readable medium of claim 4, wherein the plurality of prefixes corresponds to a pair of adjacent ranges of addresses.

9. The non-transitory machine-readable medium of claim 8, wherein the first prefix has a netmask of 23 bits and each of the plurality of prefixes has a netmask of 24 bits.

10. The non-transitory machine-readable medium of claim 1, wherein the exact match table entry for a prefix of length N stores a plurality of forwarding indications corresponding to $2^k$ prefixes of length N+k and the first forwarding result is selected from the plurality of forwarding indications using bits N+1 to N+k of the destination address.

11. The non-transitory machine-readable medium of claim 1, wherein a forwarding indication is selected from the group consisting of a nexthop indication, a transmitting interface indication, and a transmitting virtual interface indication.

12. A method to determine a match for a destination address using an exact match table and a longest prefix match table, the method comprising:
  receiving, with a network element, a data packet that includes a destination address;
  generating a lookup key for the destination address, wherein the lookup key represents more addresses than the destination address;
  performing an exact match table address lookup using the lookup key with an exact match table, wherein a first forwarding result is derived from a match in the exact match table address lookup and at least one of the entries in the exact match table includes,
an exact match table key, and
a plurality of forwarding indications, wherein each of the plurality of forwarding indications is associated with one of a plurality of prefixes associated with the exact match table key;
performing a longest prefix match address lookup using the destination address with the longest prefix match table, wherein a second forwarding result is derived from a match in the longest prefix match address lookup and at least some of content in the lookup key overlaps with content used for the longest prefix match address lookup;
determining a resolved forwarding result based on results from the exact match table address lookup and the longest prefix match address lookup; and
forwarding the data packet using the resolved forwarding result.

13. The method of claim 12, wherein the determining the resolved forwarding result comprises:
selecting the first forwarding result when there is a match for both of the exact match table address lookup and the longest prefix match address lookup.

14. The method of claim 12, wherein the determining the resolved forwarding result comprises:
selecting the second forwarding result when there is a match for both of the exact match table address lookup and the longest prefix match address lookup.

15. The method of claim 12, wherein the determining the resolved forwarding result comprises:
selecting the second forwarding result when there is a match for the longest prefix match address lookup but not the exact match table address lookup.

16. The method of claim 12, wherein the generating the key comprises:
determining a prefix length for the lookup key; and
masking a plurality of lower bits of the destination address based on the prefix length.

17. The method of claim 12, wherein the performing the exact match address lookup comprises:
receiving a plurality of lookup keys with different prefix lengths that are generated from the destination address;
matching the plurality of lookup keys to a plurality of exact match table keys stored in the exact match table, wherein each of the plurality of exact match table keys stored in the exact match table is associated with a different prefix and a different one of the plurality of forwarding indications;
determining which of the plurality of prefixes matches the destination address; and
returning a first forwarding result associated with the matching prefix.

18. The method of claim 17, wherein the determining of the matching prefix comprises: selecting a first forwarding result associated with one of the matching exact match table keys when there are multiple matches from the plurality of lookup keys.

19. The method of claim 17, wherein at least one of the different prefixes is a union of a plurality of further prefixes.

20. A non-transitory machine-readable medium having executable instructions to cause one or more processing units to perform a method to determine a match for a destination address using a plurality of exact match tables and a longest prefix match table, the method comprising:
receiving, with a network element, a data packet that includes a destination address;
generating a plurality of lookup keys from the destination address, wherein each of the plurality of lookup keys represents more addresses than the destination address and each of the plurality of lookup keys represents a different prefix length;
performing an exact match table address lookup using the plurality of lookup keys with the plurality of exact match tables, wherein a plurality of first forwarding results are derived from a plurality of matches in the exact match table address lookup;
performing the longest prefix match address lookup using the destination address with a longest prefix match table, wherein a second forwarding result is derived from a match in the longest prefix match address lookup;
determining a resulting forwarding result based on results from the exact match table address lookup and the longest prefix match address lookup; and
forwarding the data packet using the resulting forwarding result.

21. The machine-readable medium of claim 19, wherein each of the plurality of exact match tables is associated with a different prefix length.

22. The machine-readable medium of claim 1, wherein the destination address is one of the addresses encompassed by the lookup key.

23. The machine-readable medium of claim 1, wherein the destination address is one of the addresses encompassed by the lookup key.

* * * * *